Patented Feb. 10, 1931

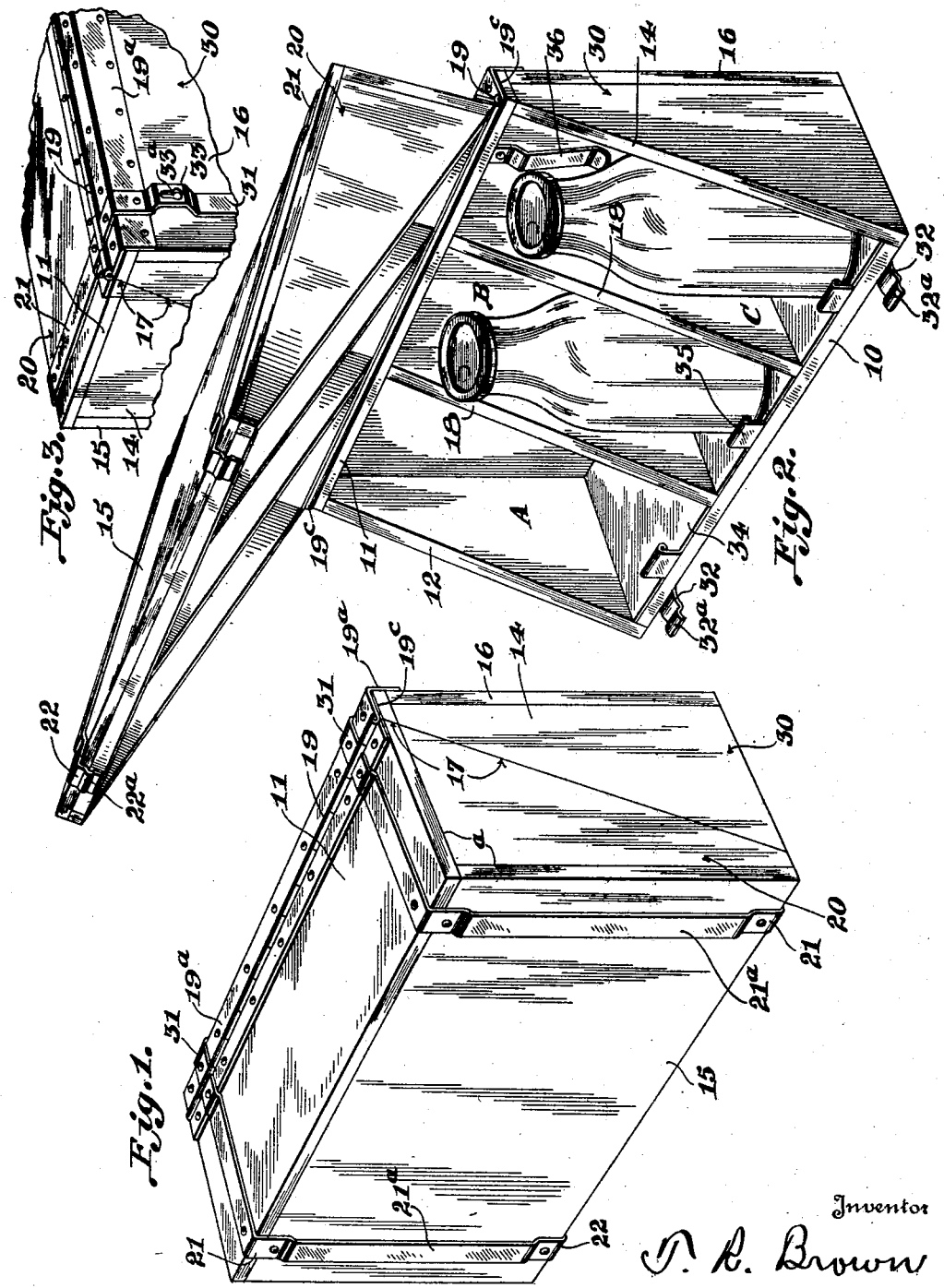

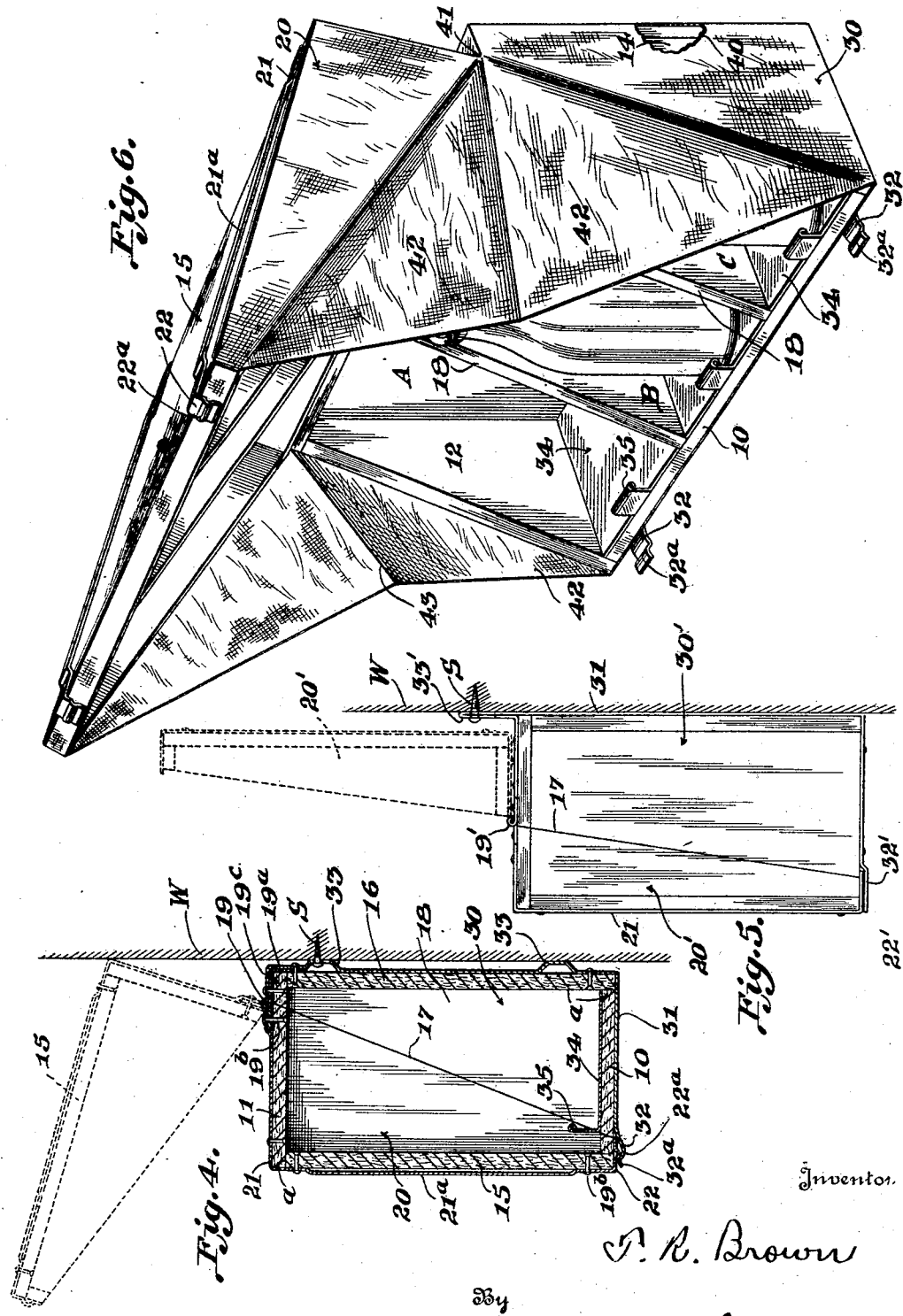

1,791,709

UNITED STATES PATENT OFFICE

TOM R. BROWN, OF KENNETT SQUARE, PENNSYLVANIA, ASSIGNOR TO THE GLACIFER CORPORATION, OF KENNETT SQUARE, PENNSYLVANIA, A CORPORATION OF DELAWARE

CABINET FOR MILK BOTTLES AND THE LIKE

Application filed March 9, 1928. Serial No. 260,469.

This invention relates to certain improvements in cabinets for milk bottles and the like; and the nature and objects of the invention will be readily recognized and understood by those skilled in the art in the light of the following explanation and detailed description of the accompanying drawings illustrating what I at present consider to be the preferred embodiments or mechanical expressions of my invention from among various other forms, arrangements, combinations and constructions of which the invention is capable within the spirit and scope thereof.

More particularly, although not so limited, the invention deals with the problem of overcoming and eliminating in a practical and highly efficient manner, the serious and dangerous conditions to which bottled milk is subjected in the periods from its distribution and delivery, to the collection thereof by the consumer and its removal to a safe and sanitary location. Bottled milk is generally delivered by milkmen at very early hours in the morning by placing the same at exterior points of buildings, such as on porches, doorsteps, walks, and similar locations, where it must stand exposed to the action of atmospheric temperatures, and to possible contamination from various sources, such as moisture, dirt, dust, and animals, until it is removed by the consumer. It is well established that under these conditions milk frequently spoils or sours, and is frequently seriously contaminated, in fact milk under such conditions, as well known, tends to increase its bacterial content, all to the serious endangering of the health of the consumer. Similarly, the same conditions may apply to other perishable food stuffs delivered in such manners to the consumer and allowed to stand exposed and improperly protected against dangerous contamination.

It is a main and general object of the present invention to overcome and eliminate the dangerous and extremely serious results arising from the delivery of perishable food stuffs, and particularly bottled milk, under the foregoing conditions, through the provision of a storage cabinet or container capable of mounting in an accessible location on the exterior of a building for receiving bottled milk or other perishable food stuffs, and which cabinet forms a completely protecting enclosure or housing for the contents thereof against moisture, dirt and other sources of contamination, as well as providing a highly efficient insulation against temperature or heat exchange so as to maintain the temperature at which the contents are placed therein over considerable periods of time, while retaining for the cabinet those desirable characteristics from among others, of low cost of manufacture, durability, pleasing appearance with compactness, ease of access for ready insertion and removal of the contents, and complete access to every portion of the interior of the cabinet to permit of readily cleaning the same to maintain the cabinet in a sanitary condition.

A characteristic of the invention resides in the provision of a protective storage cabinet for receiving perishable foods, such as bottled milk, with individual compartments formed therein by partitions, and which cabinet is formed of complementary vertical sections, the forward one of which is pivotally mounted to the other and forms a cover or closure for the cabinet so that in closed position thereof the partitions and end walls closely meet and are alined to obtain the desired closing against passage of moisture, dirt or the like, as well as temperature exchange, from and with the exterior of the cabinet, and between the individual compartments, while such cover can be swung to open position completely opening the base or other section for easy access in removing or inserting the contents, and further completely exposing the entire interior of the cabinet (both sections) for cleaning.

A further object of the invention resides in the provision of a cabinet having any and/or all of the foregoing characteristics, which is formed from a material having high insulating qualities against temperature or heat exchange, yet which in and of itself has relatively high structural strength and rigidity.

Another object of the invention is to provide such a cabinet with a covering of a suitable flexible material so formed and arranged thereon as to itself form the pivotal mounting for the cover or closure, and which in closed position of the cabinet provides a seal for and between the cover and cabinet.

Another object of the invention is to provide a design and construction of such a protective storage cabinet by which a structure of extreme simplicity and minimum number of parts is made possible, lending itself to quantity production, yet which retains and presents the foregoing enumerated, as well as certain other, necessary and desirable characteristics and advantages through the presence of which a cabinet is possible which will meet the sanitary and food protecting and safeguarding requirements, as well as those by which the cabinet is practical in the hands of the user.

With the foregoing general objects and characteristics, as well as certain others which will be readily apparent from the following explanation, the invention consists in certain novel features in constructions and in combinations and arrangements of parts as will be more fully and particularly referred to and specified hereinafter.

Referring to the accompanying drawings, in which similar reference characters refer to corresponding parts throughout the several figures thereof:

Fig. 1, is a perspective view of one form of cabinet of the invention, with the cover forming section in position closing the cabinet.

Fig. 2, is a perspective view of the cabinet of Fig. 1, in open, cover or closure raised position, showing the position and accessibility of bottled milk in the opened compartments of the cabinet.

Fig. 3, is a detail perspective view from the rear of the cabinet showing the arrangement of the rear section band or strap to provide the elements for mounting the cabinet, and the hinge construction and sealing strip therefor.

Fig. 4, is a view in transverse, vertical section, through the cabinet with the raised cabinet opening position of the cover indicated in dotted outline, the cabinet being shown in mounted position on a portion of a wall.

Fig. 5, is a view in end elevation of a modified form of the cabinet in mounted position on a support, with the cover section formed to swing up onto and be supported by the rear or body section, the open position of the cover being shown in dotted outline.

Fig. 6, is a perspective view of another form of cabinet of the invention in open position, showing the open, extended position of the fabric seal and hinge forming covering for the cabinet.

The forms of the invention presented herewith purely by way of example and not of limitation, are disclosed as designed particularly for use in receiving and protecting bottled milk, but it is to be understood, and the invention so contemplates and includes, that cabinets of the invention can be designed and can be used for receiving and protecting any and all kinds of perishable foods, packaged in any way or in bulk, as well as used generally for protecting any and all articles. The various problems and disadvantages overcome by the invention are met with in a high degree in the handling and delivery of bottled milk, and hence such serves to more clearly bring out the various features and advantages of the invention.

According to one of the objects and features of the invention, the examples of the cabinets hereof, are formed from a material having a high efficiency as an insulating medium against exchanges of temperature, that is, a non-conductor of heat, so as to provide when closed an insulating container or cabinet which will maintain the temperature of articles placed therein for a considerable period. However, while this is a highly desirable characteristic in those cabinets intended for the protection of perishable foods, all features of the invention in design, construction and operation are not limited thereto, as it is contemplated that where desired or found expedient, the cabinets can be formed of any material or materials, including metal.

In a preferred form of the invention shown in Figs. 1 to 3, inclusive, of the drawings, and particularly designed for use with bottled milk and such like, the cabinet comprises a box-like structure of substantially rectangular form, although not so limited, formed of the bottom wall 10, top wall 11, end walls 12 and 14, and the front wall 15 and rear wall 16. These walls of the cabinet are in this instance constructed from a suitable material having high insulating qualities of relatively light weight with the required structural strength, such as certain woods, or certain of the so-called fibre boards of commerce, and, where necessary, are suitably treated or coated to render the same moisture proof. Preferably, these cabinet walls are assembled and secured together with the top 11 fitted against and over the upper edges of the end walls 12 and 14, and the front and rear walls 15 and 16, and the bottom wall 10 fitted between the front and rear and end walls, as will be clear by reference to Fig. 3 in particular of the drawings, in order to eliminate joints or breaks between the walls in the top, and in the front and rear of the cabinet. The cabinet walls are in the preferred example hereof bound or secured together primarily by any suitable glue or adhesive to provide tight, strong and moisture proof joints $a$ between and securing the walls rigidly together in assembled cabinet forming relation. By this construction a proper closure and seal is obtained between the walls, and metal or the like fastenings are eliminated with the difficulty of obtaining the desired tight joint and seal between walls, as well as the possibility of such metal acting as a conductor of heat to the interior of the cabinet.

In the example hereof the cabinet is designed particularly for bottled milk and separate or individual compartments A, B, and C are formed within the cabinet of the desired size to each receive a bottle of milk, by means of the vertically disposed partitions or dividing walls 18 extending transversely of the same from front to rear. The partitions 18 are secured at and along their edges to the adjacent walls, respectively, of the cabinet preferably in the same manner as the walls themselves are secured together, that is, through the medium of a suitable strong binder, adhesive or glue, so as to form the desired closed, tight and moisture-proof joints a therebetween. While in the example hereof, three compartments are shown as formed by two partitions 18, it is of course clear that any desired number of compartments of the desired size can be so formed, or the partitions can, if desired, be completely omitted to provide a single compartment by the interior of the cabinet.

This box-like structure so formed and having the compartments A, B, and C formed therein by the partitions 18, is divided into complementary vertical, front and rear sections 20 and 30 by means of a cut or the like 17 extending completely through and severing the cabinet from top to bottom and end to end thereof, through the top, bottom, opposite end walls, and the partitions 18. The cut or severance of the cabinet to divide the same into the front and rear sections 20 and 30, in accordance with a feature of the invention, is inclined forwardly and downwardly from adjacent to and spaced inwardly a distance from rear wall 16, to and through the lower or bottom wall 10 adjacent to and spaced inwardly a distance from the front wall 15, so that the rear or main body section 30 of the cabinet and those portions of the partitions 18 therein, slope or are inclined at the forward sides thereof upwardly and rearwardly from the forward portion of the base or bottom wall 10, as will be clear by reference to the accompanying drawings. The rear section 30 provides the base or bottle receiving and supporting portion of the cabinet while the forward section 20 provides the cover or closure for the cabinet by which access is obtained to the rear section and the compartments thereof.

The forward or closure section 20 is pivotally or swingably mounted on and connected to the rear or base section 30, along their upper ends at the cut or severance 17 through the top wall 11, by means of a preferably continuous hinge 19 secured along and over the cut 17 in the top wall 11 on the exterior of the cabinet. When so mounted the closure section depends and is maintained by gravity on and against the base or rear section 30 in normal cabinet forming and closing position with the forward and rear sections of the end walls 12 and 14, and partitions 18, in alinement and abutting, due to the fact that the sections are complementary, and thus form relatively tightly fitted joints beween the sections. The closure section 20 is swingable upwardly and rearwardly into vertically disposed position above, removed from, and opening the base or rear section for free access thereto. In cabinet opening position the closure section 20 is swung upwardly and due to the position of the dividing cut 17 in top wall 11 the cover or front section 20 in open position will tend to extend or project beyond rear wall 16 of the base section 30, but due to the support on which generally mounted, the cover section will be limited in its rearward movement and stopped in a position such that it must be held against gravity and when released will fall to closed position, as will be explained hereinafter in connection with Fig. 4. In this manner, the possibility of the cover or closure being inadvertently left open with perishable contents in the cabinet is eliminated.

In the present example the hinge 19 is formed with an extended rear leaf 19a which covers the section of top wall 11 on rear section 30, and extends downwardly a distance over rear wall 16, thus forming a protecting covering for these parts. The hinge is secured in the example hereof by fastening members, such as nails 19b extended through the cabinet walls and countersunk on the interior, where they are sealed by any suitable sealing material such as glue, as will be clear by reference to Fig. 4. In order to prevent leakage, a waterproof, flexible sealing strip 19c is disposed and secured beneath hinge 19 over and across the cut 17 in upper wall 11 between cabinet sections 20 and 30 (see Fig. 4).

As added strengthening means, each section of the cabinet is provided with the spaced bands or straps 21 and 31, respectively, extending thereover on the exterior adjacent the opposite ends thereof and in alinement on the sections. The bands 31 of base section 30 extend from the hinge 19 over leaf 19a thereof and then downwardly over the rear wall 16 and forwardly over the bottom wall 10. The forward, lower ends 32 of bands 31 are extended forwardly beyond the cut or division in the bottom wall and are offset or spaced downwardly from the bottom wall and transversely grooved to form the elevated forward resilient portions or lip 32a, for a purpose to be explained. The bands 21 on the forward or closure section 20 extend forwardly from hinge 19, downwardly over the forward wall 15, and then rearwardly over the closure section portion of bottom wall 10, and these lower wall end portions 22 of bands 21 are also transversely grooved to form the depending ribs 22a. The portions 22 fit over and between the projected ends 32 of bands 31 and the lower wall 10, the ribs 22a snapping over lips 32a, slightly and frictionally engaging to retain the closure 20 in tightly closed position on rear or base section 30 against displacement. Preferably, the securing members for bands 21 and 31 take the form of the nails, screws or the like 19b referred to in connection with the hinge 19 and sealed on the interior of the cabinet to prevent and eliminate transfer of temperature between the interior and exterior of the cabinet. The bands 21 adjacent the upper ends thereof at the rear wall 16 are formed with elevated or outwardly offset and projecting portions 33 having the slots 33a formed therein (see Figs. 3 and 4) by which the cabinet is attached and mounted on a suitable support. Similar offset portions 33 are provided adjacent the bottom of the cabinet on bands 21 to form abutments engaging the support on which the cabinet is mounted or hung to maintain the same level. On the cover section 20 at the front wall 15, the bands 21 are offset outwardly to provide for placing the ends of a card, sign or the like thereunder and retain the same in position on the cabinet.

Each of the compartments A, B, and C formed in the cabinet is preferably provided with a bottom plate or bottle receiving lining 34 secured on the bottom wall 10 and formed of a suitable relatively bright non-corrosive and stainless metal to aid in maintaining the cabinet in a sanitary clean condition, by clearly visually indicating the presence of any dirt, dust or other foreign matter thereon which may have obtained entry into the cabinet. Each of the compartment bottom plates 34 is formed and provided at its forward end with an upturned, vertically disposed flange portion or tab 35 forming a bottle retaining member to prevent displacement or sliding of a bottle forwardly of the cabinet. Any suitable or desired spring clip or the like 36 can be mounted on the interior of the cabinet against the rear wall 16 (see Fig. 2) for the purpose of retaining papers or the like.

With the foregoing design, arrangement and construction of cabinet of the invention, where formed of insulating material, with the closure 20 in lowered position swung downwardly to close the cabinet, the interior thereof and any articles therein such as bottled milk, are efficiently insulated against temperature or heat exchange, as well as protected against moisture and contamination from dirt and other sources, due particularly to the formation of the cabinet of the complementary sections with the walls and the interior partitions thereof smoothly and accurately fitting and mating to effectively close the cut or division between the sections. In closed position the partitions 18 form the individual compartments A, B, and C, which are closed and effectively insulated from each other and from the exterior of the cabinet. Referring to Fig. 4, the cabinet is disclosed mounted and supported on and against a wall or the like W, by the upper offset portions 33 receiving the heads of the screws, nails or the like S in the slots 33a thereof, and with the lower offset portions 33 engaging the wall and maintaining the desired level of the cabinet. The closure or front section 20 can be swung to open position as shown in dotted lines in Fig. 4 (see also Fig. 2), and will be limited in its upward movement by wall W, so that on release of the cover 20 it will fall by gravity to closed position retained by the engaging members 32 and 22. This eliminates possibility of accidentally leaving the cabinet open and exposing the contents thereof. The formation of the cabinet into forward and rear sections enables the complete exposure of the interior of the cabinet with the front or closure section swung to open position, thus giving complete freedom of access in inserting and removing bottled milk from the cabinet and the compartments thereof, as well as the essential requirement for proper sanitation of permitting ready cleaning of the cabinet. Attention is here directed to the fact that by reason of the location of the division between the sections and the upward and rearward slope thereof, with the front or closure section 20 of the cabinet in open position the base or rear section portions of partitions 18 and end walls 12 and 14 decrease in width upwardly with the result that the upper ends of bottles can be grasped and the bottles readily inserted in or removed from the cabinet and the compartments thereof without interference from the partitions or end walls, as clearly illustrated by Fig. 1 of the drawings.

A modified arrangement of the cabinet is disclosed in mounted position by Fig. 5 of the accompanying drawings, in which the cut or division 17 between the cabinet sections 20' and 30' is reduced in rearward slope or inclination and extends through the top of the cabinet spaced a sufficient distance forwardly to permit of the cover section 20' being swung upwardly and rearwardly to position resting and supported on the rear section 30', which forms a supporting base therefor. The open position of the cover section 20' supported on rear or base section 30' is indicated by dotted lines in Fig. 5, and with this form of the invention it becomes unnecessary for the use to hold the cover section 20' in open position, thus freeing both hands for use in placing or removing articles from the cabinet. Any suitable hinge 19' of the type referred in Figs. 1 to 4 is employed for connecting the sections 20' and 30'.

Fig. 5 also discloses a modified formation of the bands 21 and 31, by which the rear section bands 31 are bent upwardly at the top of the cabinet to provide the mounting tabs or straps 33', suitably slotted to fit over and receive the members S secured in wall or other support W. In this form of the invention the engaging ends 22' and 32' of the bands 21 and 31, respectively, are formed substantially flat to preferably frictionally engage to assist in retaining the cover section 20' in closed position.

In a form of the invention shown in Fig. 6 of the drawings certain further features of the invention are illustrated. The cabinet is constructed as hereinbefore described with the exception that in this form the cut or division 17 between the cabinet sections slopes rearwardly at a greater angle and is located in the upper wall adjacent the rear edge thereof at such a distance therefrom that the closure section 20 cannot be swung thereunto with the cabinet in usual mounted position. The cabinet of Fig. 6 is covered with a suitable flexible material such as canvas 40 which may be tightly stretched and secured thereon. The canvas 40 in the present example extends across and over the cut between the sections 20 and 30 in the cabinet top wall 11 and thus forms a hinge or flexible connection at 41 to pivotally connect the forward or closure section 20 to the rear or base section 30. In order to form an additional seal between the sections in closed positions, wings or flaps 42 of the canvas are formed extending between the adjacent opposite ends of the sections 20 and 30 and these wings or flaps are formed to fold inwardly on the fold lines 43 when the closure section is swung downwardly into its cabinet closing position, and extend inwardly a distance over and across the cabinet, to thereby form a seal between the ends of the cabinet sections in closed position thereof.

A cabinet for bottled milk and other foods and articles is thus provided which meets the rigid sanitary requirements for such devices as well as the requirements for ease of operation and use which will appeal to both the distributor and the consumer, and which is of a simple, inexpensive and readily manufactured construction having the required appearance and capable of mounting in the required locations, and one which provides a safeguard to public health.

It is also evident that various changes, modifications, variations and substitutions might be resorted to without departing from the spirit and the scope of my invention, and hence I do not wish to limit myself to the exact and specific disclosures hereof.

Desiring to protect my invention in the broadest manner legally possible, what I claim is:

1. A protective storage cabinet for bottled milk and the like, comprising a box-like structure having vertical transverse partitions therein forming the interior thereof into individual bottle receiving compartments, said structure, including the partitions, divided into complementary forward and rear sections on a vertical plane extending therethrough and inclined upwardly and rearwardly from adjacent the front wall thereof, said sections pivotally connected at their upper ends with the forward section swingable upwardly to position above and completely opening the rear section with the compartments thereof, the partitions of the rear section decreasing in width upwardly to permit of ready grasping of the upper ends of a bottle in a compartment formed therebetween, and the said forward section in cabinet closing position swung downwardly onto the rear section having the wall and partition sections thereof alined and accurately mating with the wall and partition sections, respectively, of the rear section to form the substantially tightly closed cabinet.

2. A protective storage cabinet for bottled milk and the like, comprising a box-like structure formed into vertical complementary sections pivotally connected at their upper ends with the forward section swingable upwardly to position above and completely opening the rear section, spaced bands extending transversely over the rear section, said rear section bands formed at the upper side of the section into cabinet supporting members and at the forward lower side of the cabinet formed to project therebeyond, and spaced bands extending transversely over the forward section alined with said rear section bands, the lower rear end portions of said forward section bands in lowered closed position of the forward section frictionally engaging the projected portions of the rear section bands to assist in maintaining the sections closed against displacement.

3. As a new article of manufacture, an insulating protective storage cabinet for bottled milk and the like, comprising a box-like structure formed of heat insulating and moisture proof material having the joints between walls thereof sealed, said structure formed into vertical complementary sections pivotally connected at their upper ends with the forward section swingable upwardly to position completely opening the rear section, said sections in closed position having the edges of the divided walls thereof alined and fitting together to form a substantially closed and tight joint therebetween sealed against passage of fluids therethrough.

4. As a new article of manufacture, an insulating protective storage cabinet for bottled milk and the like, comprising a box-like structure having spaced vertical partitions therein transversely thereof extending from top to bottom and front to rear of the structure, said structure including the partitions formed of heat insulating and moisture proof material with the joists between the walls and between the partitions and walls sealed, and said structure so formed divided on a vertical plane inclined upwardly and rearwardly therethrough into vertical, complementary front and rear sections pivotally connected at their upper ends with the front section swingable upwardly to position completely opening the rear section, said sections in closed position having the walls and partition sections thereof alined and fitting together to form substantially closed and tight joints therebetween with the partitions forming the cabinet into a series of compartments completely closed and insulated from each other and the exterior of the cabinet.

5. A protective storage cabinet for bottled milk and the like, comprising a box-like structure formed into vertical complementary sections pivotally connected at their upper ends with the forward section swingable upwardly to position above and opening the rear section, spaced bands extending transversely over the rear section and formed with offset and slotted portions at the upper end of the rear wall of the cabinet for mounting the cabinet, said rear section bands projected forwardly beyond the bottom wall of the rear section to provide resilient fingers, said fingers formed with elevated end lips, and spaced bands extending transversely over the forward section alined with the rear section bands, the lower end portions of said forward section bands provided with depending ribs for engaging the lips of the rear section band fingers to retain the forward section in closed position on the rear section.

Signed at Kennett Square, county of Chester, Pennsylvania, this 10th day of Dec., 1927.

TOM R. BROWN.